United States Patent
Arcella et al.

(10) Patent No.: US 6,767,977 B2
(45) Date of Patent: Jul. 27, 2004

(54) FLUORINATED IONOMERS

(75) Inventors: Vincenzo Arcella, Milan (IT); Alessandro Ghielmi, Milan (IT); Giulio Tommasi, Milan (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 10/324,124

(22) Filed: Dec. 20, 2002

(65) Prior Publication Data

US 2003/0171444 A1 Sep. 11, 2003

(30) Foreign Application Priority Data

Dec. 21, 2001 (IT) .......................................... MI01A2746

(51) Int. Cl.[7] .............................................. C08F 114/18
(52) U.S. Cl. ...................... 526/243; 526/247; 526/252; 526/253; 526/255; 526/286; 526/287
(58) Field of Search ................................. 526/243, 247, 526/252, 253, 255, 286, 287

(56) References Cited

U.S. PATENT DOCUMENTS

| | | | |
|---|---|---|---|
| 2,242,218 A | 5/1941 | Auer et al. | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,035,565 A | 7/1977 | Apotheker et al. | |
| 4,243,770 A | 1/1981 | Tatemoto et al. | |
| 4,297,194 A | 10/1981 | Dotson et al. | |
| 4,358,545 A | * 11/1982 | Ezzell et al. .................. 521/27 |
| 4,564,662 A | 1/1986 | Albin | |
| 4,694,045 A | 9/1987 | Moore | |
| 4,745,165 A | 5/1988 | Arcella et al. | |
| 4,943,622 A | 7/1990 | Naraki et al. | |
| 5,173,553 A | 12/1992 | Albano et al. | |
| 6,140,436 A | 10/2000 | Doyle et al. | |

FOREIGN PATENT DOCUMENTS

| EP | 0 053 455 A1 | 6/1982 |
|---|---|---|
| EP | 0 088 285 A2 | 9/1983 |
| EP | 0 148 482 | 7/1985 |
| EP | 0 199 138 | 10/1986 |
| EP | 0 239 123 | 9/1987 |
| EP | 0 838 482 A2 | 4/1998 |

OTHER PUBLICATIONS

World Intellectual Property Organization, International Bureau, International Application Published Under the PCT, Pub. No. WO 94/03503, Pub. Date Feb. 17, 1994, Barnes, et al.

* cited by examiner

Primary Examiner—Helen L. Pezzuto
(74) Attorney, Agent, or Firm—Arent Fox, PLLC

(57) ABSTRACT

Semicrystalline sulphonic fluorinated ionomers having an equivalent weight higher than 700 g/eq, up to 1,700, comprising:

(A) monomeric units deriving from one or more fluorinated monomers containing at least one ethylene unsaturation;

(B) fluorinated monomeric units containing sulphonyl groups —$SO_2F$ in such amount to give the above equivalent weight, deriving from $F_2C{=}CF{-}O{-}(CF_2)_q{-}SO_2F$, q being an integer equal to 2 or 3;

and having the following properties for a TFE/(B) copolymer:

hydration, expressed in % of $H_2O$ at 100° C. absorbed by the film prepared from the ionomer and after tranformation from the —$SO_2F$ form into the —$SO_3H$ form, having the following values:

| at | 750 EW | higher than | 55%, | pref. | >70% |
|---|---|---|---|---|---|
| at | 850 EW | " | 45%, | " | >55% |
| at | 1,000 EW | " | 35%, | " | >40% |
| at | 1,100 EW | " | 28%, | " | >32% |
| at | 1,200 EW | " | 23%, | " | >25%. |

19 Claims, No Drawings

FLUORINATED IONOMERS

The present invention relates to sulphonic fluorinated ionomers and membranes obtained therefrom, said membranes usable also at high temperatures, of the order of 100° C. –180° C., in electrochemical applications, for example in fuel cells.

Specifically, the invention relates to membranes of sulphonic fluorinated ionomers having even very thin thicknesses up to a limit lower than 5 µm and having a high hydration degree and good mechanical properties under the use conditions.

More specifically, the sulphonic fluorinated ionomers used for the membrane preparation have equivalent weight, higher than 700, preferably between 720 and 1,700. Said membranes show, the equivalent weight being equal, an improved hydration degree compared with those of the prior art, combined with good mechanical properties.

The sulphonic fluorinated ionomers of the invention are partially crystalline and have an equivalent weight (EW) as above.

It is known in the prior art the use of the class of polymers called with the term ionomers in electrochemical applications, such for example in fuel cells, chloro-soda cells, lithium batteries, electrodialysis and in reactors in which the ionomer acts as a solid catalyst. Said applications implie the ionomer contact with an aqueous or polar liquid having affinities with the ionic functional groups of the ionomer.

In electrochemical applications, for example in fuel cells, there is a direct correlation between the ionomer conductivity and the water retention of the ionomer. The polymer ionic conductivity, besides being increased by a higher presence of ionic groups in the polymer, results significantly increased also by a larger amount of water that the polymer can retain (hydration degree).

The ionomer/membrane for the industrial application must be activated before the use, wherefore the chemical transformation of the precursor groups —$SO_2F$ into the corresponding ionic groups —$SO_3H$ is necessary. The membrane activation is carried out first by contacting with an alkaline aqueous solution and then with an acid solution (see later on).

In the prior art, to obtain membranes with sufficient physical integrity, polymers having an equivalent weight of about 1,100 are usually used. An example of such membranes is represented by the commercial product NAFION®, used in the fuel cells. Said membranes, to have a good physical integrity, are typically obtained with an ionomer having equivalent weight of about 1,100. Such membranes show a not high conductivity. Besides, if said membranes are used under dehydration conditions, or with unsaturated feeding fluids to the cell, in particular at cell temperatures higher than 100° C., they tend to dehydrate and the membrane conductivity is drastically reduced. Consequently the NAFION® membranes are not effectively usable, in particular at temperatures higher than 100° C. and under dehydration conditions of the feeding fluids to the cell.

The sulphonic ionomers described in the prior art do not allow to obtain membranes with an optimal combination of good physical integrity and high hydration. In particular in the car industry the need is felt to have available ionomeric membranes having a very high conductivity. This is obtainable when the membrane shows high hydration and good mechanical properties so as to be able to manufacture the membrane in extremely thin thicknesses, for example from 5 to 80 µm. Furthermore membranes having a very high conductivity allow to generate the same electric power with a smaller membrane surface. This is extremely desired in the car industry since it allows to reduce the size and thus the stack weight and cost. Besides, very thin membranes better resist critical dehydration conditions, since the water generated at the cathode side can more easily migrate to the anode side. Furthermore the dehydration is much higher as the cell working temperature is higher, the humidification degree of the feeding fluids thereto being equal. A high cell temperature, for example higher than 100° C., is desirable since it allows a more effective heat exchange.

Besides, the fuel cells of the prior art use very pure hydrogen not to have poisoning of the platinum-based electrodes. Indeed if reforming hydrogen is used, thus containing CO, there is a rapid poisoning of the platinum. According to the prior art, therefore, the hydrogen from reforming must be purified from CO before being used in the fuel cells. This phenomenon is remarkably reduced when the cell works at temperatures from 110 to 120° C., and it is practically absent at working temperature of about 150° C.

Therefore it is desirable that the membrane shows improved hydration properties, can be used also at high temperature, for example higher than 100° C., and shows improved mechanical properties so as not to lose its physical integrity even in extremely thin thicknesses.

Tests carried out by the Applicant have shown that with the ionomers reported in the prior art, the membranes do not show said property optimal combination.

Said membranes must be available for wide range applications, such for example in the automotive field, and therefore they must be obtainable by a process which allows its production on a large scale by continuous processes having a high efficiency, reliability and reproducibility.

The need was therefore felt to have available sulphonic fluorinated ionomers with EW higher than 700, and up to 1,700, having improved hydration properties combined with high mechanical properties able to give also thin membranes having a thickness up to a lower limit of 5 µm, usable both at room temperature and at high temperature (as above defined), without substantially compromising the physical integrity of the membrane.

The Applicant has surprisingly and unexpectedly found sulphonic fluorinated ionomers capable to solve the above technical problem.

An object of the present invention are semicrystalline sulphonic fluorinated ionomers having an equivalent weight higher than 700 g/eq, up to 1,700, preferably 720–1,500, comprising:

(A) monomeric units deriving from one or more fluorinated monomers containing at least one ethylene unsaturation;

(B) fluorinated monomeric units containing sulphonyl groups —$SO_2F$ in such amount to give the above equivalent weight, deriving from $F_2C=CF—O—(CF_2)_q—SO_2F$, q being an integer equal to 2 or 3;

and having the following properties for a TFE/(B) copolymer wherein q=2:

hydration, (see hereafter) expressed in % of $H_2O$ at 100° C. absorbed by the film prepared with the ionomer and after transformation from the —$SO_2F$ form into the —$SO_3H$ form, having the following values:

| at | 750 EW | higher than | 55%, | pref. | >70% |
| at | 850 EW | " | 45%, | " | >55% |
| at | 1,000 EW | " | 35%, | " | >40% |

-continued

| at | 1,100 EW | " | 28%, | " | >22% |
| at | 1,200 EW | " | 23%, | " | >25% |

The invention ionomers, for a TFE/(B) copolymer wherein q=2, show film extrudability, under the —SO$_2$F form, with thickness of 20 μm having good mechanical properties.

The invention ionomers, for a TFE/(B) copolymer wherein q=2, show furthermore a melt flow index comprised between 0.01 and 100 g/10', with a load of 5 kg measured at 280° C., and after transformation from the —SO$_2$F form into the —SO$_3$H form, as hereafter indicated.

The mechanical properties of the invention ionomers, for a TFE/(B) copolymer wherein q=2, are high, in particular there are the following mechanical properties of the film at 23° C. at:

| 750 EW | tensile stress (MPa) | >4, | pref. | >5 |
| 850 EW | " | >10, | " | >15 |
| 1,000 EW | " | >20, | " | >25 |
| 1,100 EW | " | >20, | " | >28 |
| 1,200 EW | " | >20, | " | >30 |

The fluorinated monomers of type (A) are selected from:

vinylidene fluoride (VDF);

C$_2$–C$_8$ perfluoroolefins, preferably tetrafluoroethylene (TFE);

chlorotrifluoroethylene (CTFE), optionally in the presence of ethylene, (per)fluoroalkylvinylethers (PAVE) CF$_2$=CFOR$_f$, wherein R$_f$ is a C$_1$–C$_6$ (per)fluoroalkyl, for example trifluoromethyl, pentafluoropropyl;

perfluoro-oxyalkylvinylethers CF$_2$=CFOX, wherein X is a C$_1$–C$_{12}$ perfluoro-oxyalkyl having one or more ether groups, for example perfluoro-2-propoxy-propyl.

Preferably (A) is TFE. Preferably (B) is the monomer with q=2.

Optionally the sulphonic fluorinated ionomers of the invention can contain from 0.01 to 5% by moles of monomeric units deriving from a bis-olefin of formula:

R$_1$R$_2$C=CH—(CF$_2$)$_{m0}$—CH=CR$_5$R$_6$     (I)

wherein:

m0=2–10, preferably 4–8;

R$_1$, R$_2$, R$_5$, R$_6$, equal to or different from each other, are H or C$_1$–C$_5$ alkyl groups. The introduction of the bis-olefin has the advantage to increase the length of the polymer chains.

Preferably the fluorinated sulphonic ionomers of the invention comprise:

monomeric units deriving from TFE;

monomeric units deriving from CF$_2$=CF—O—CF$_2$CF$_2$SO$_2$F; optionally, monomeric units deriving from the bis-olefin of formula (I).

The invention ionomers can optionally contain I and/or Br atoms. It can be carried out by addition, in the reaction mixture, of brominated and/or iodinated "cure-site" comonomers, such bromo and/or iodo olefins having from 2 to 10 carbon atoms (as described for example in U.S. Pat. Nos. 4,035,565 and 4,694,045), or iodo and/or bromo fluoro-alkylvinylethers (as described in U.S. Pat. Nos. 4,745,165, 4,564,662 and EP 199,138). The amount of said "cure-site" is such that the content of "cure-site" comonomers in the final product is generally in the range 0.05–2 moles per 100 moles of the other basis monomeric units. Alternatively or also in combination to the "cure-site" comonomers, it is possible to introduce in the end groups iodine and/or bromine atoms by addition to the reaction mixture of iodinated and/or brominated chain transfer agents, such for example the compounds of formula R$_f$ (I)$_x$(Br)$_y$, wherein R$_f$ is a (per)fluoroalkyl or a (per)fluorochloroalkyl having from 1 to 8 carbon atoms, while x and y are integers comprised between 0 and 2, with 1≦x+y≦2 (see for example U.S. Pat. Nos. 4,243,770 and 4,943,622).

Besides, inorganic or polymer fillers can preferably be added to the ionomer to further improve the membrane hydration at high temperatures. The filler amount is between 0 and 20% by weight with respect to the ionomer. Examples of fillers are zeolites, silicas, titanates, sulphoarylphosphonates of Zr, Ti, Hf in lamellar form, etc., acrylic polymers, etc. Fillers can also be used to improve the mechanical properties. They can be organic and/or inorganic, in particular among those inorganic, silica, celite, kaolin, etc, can be mentioned; among those organic polymers such 0fluorinated polymers PVdF, PCTPE, E/CTFE, E/TFE and thermoprocessable perfluorinated polymers, for example PFA, MFA or PTFE can be mentioned. PTFE, optionally containing perfluoro(alkoxy)vinylethers and/or HFP, is preferably used in nanoparticle form (ex. 10–80 μm).

The sulphonic fluorinated ionomers of the invention can be used for the preparation of both self-supportd membranes and supported membranes. The membranes can be obtained for example by an extrusion process to obtain a film having the desired thickness. When the membranes are supported, as a support a fluorinated porous product, preferably perfluorinated, having the desired sizes and thicknesses, can be used, on which the ionomer is deposited.

The membranes of the invention are subjected to the activation treatment to transform the sulphonyl groups —SO$_2$F into the sulphonic groups —SO$_3$H. For example the activation can be carried out in 2 steps:

salification to transform the —SO$_2$F form into the —SO$_3$K form;

acidification to transform the —SO$_3$K form into the —SO$_3$H form.

For example the salification is carried out by dipping the membrane (film) in an aqueous solution containing 10% by weight of KOH at a temperature in the range 60° C. –80° C. for a time higher than 2 hours. At the salification end, the membrane is placed in a distilled water bath at room temperature to wash the residual KOH. The acidication is carried out for example by placing the salified membrane in an aqueous solution containing 20% by weight of HCl at room temperature for at least 2 hours, then a washing in demineralized water follows. The resulting membrane in the —SO$_3$H form is suitable to be used in fuel cell applications.

As said the invention membranes are usable for the above uses, preferably in fuel cells, in particular for the automotive field.

The membranes obtainable from the invention sulphonic ionomers unexpectedly and surprisingly show an optimal combination of improved hydration and improved mechanical properties, as above mentioned. Besides the non supported membranes obtainable with the invention ionomers can be obtained with particularly thin thicknesses. The invention membrane thicknesses can preferably range from 5 μm to 500 μm, still more preferably from 10 to 250 μm.

Unsupported membranes having particularly thin thicknesses, for applications in the automotive industry, have a thickness from 20 to 60 µm.

The membranes of the invention can be used in a wider temperature range, from room temperature up to 180° C., preferably from 70° C. to 120° C.

The invention membranes maintain physical integrity even by operating at high temperatures, higher than 100° C., even under conditions of unsaturation of the feeding fluids to the fuel cell.

For applications as fuel cell, the ionomers used for the membranes have EW preferably from 720 to 1,200 and more preferably from 750 to 1,100.

As said the invention ionomers are partially crystalline, i.e. they show at least a melting enthalpy peak at the DSC analysis (Differential Scanning Calorimetry).

The preparation of the invention sulphonic ionomers can be carried out by a radical polymerization process in bulk, suspension, emulsion wherein it is used a ratio:

[(B)/(A) in feeding]/[(B)/(A) in the polymer]

higher than 2.20, preferably higher than 2.50 for EW up to 800; said ratio being higher than 2.00, preferably higher than 2.20 for EW>800.

The polymerization in aqueous emulsion or in microemulsion can for example be mentioned. Surfactants which can be used in said polymerizations are (per)fluorinated for example the salts (as defined hereunder) of the perfluorooctanoic, perfluorononanoic, perfluorodecanoic acid, or mixtures thereof, etc., (per)fluoropolyethers with an acid end group (for example —COOH, —SO$_3$H), salified with NH$_4^+$, alkaline metals, the other end group being (per)fluorinated, optionally containing one H or Cl atom. The number average molecular weights of the perfluoropolyether surfactants generally range from 300 to 1,800, preferably from 350 to 750.

The polymerization in microemulsion is well known in the prior art.

In particular the preparation of the sulphonic ionomers object of the present invention is carried out by using an aqueous emulsion wherein in the reaction medium as surfactants those of formula:

are used, wherein

X is equal to —COO, —SO$_3$;

M is selected from H, NH$_4$, alkaline metal;

R$_f$ represents a (per)fluoropolyether chain, preferably having number average molecular weight comprised between about 230 and about 1,800, preferably from 300 to 750, said (per)fluoropolyether chain comprising repeating units selected from one or more of the following:

a) —(C$_3$F$_6$O)—;
b) —(CF$_2$CF$_2$O)—;
c) —(CFL$_0$O)—, wherein L$_0$=—F, —CF$_3$;
d) —CF$_2$(CF$_2$)$_{z'}$CF$_2$O—, wherein z' is an integer 1 or 2;
e) —CH$_2$CF$_2$CF$_2$O—.

R$_f$ is monofunctional, and has a (per)fluorooxyalkyl end group T, for example CF$_3$O—, C$_2$F$_5$O—, C$_3$F$_7$O—; optionally in the perfluoroalkyl end groups one fluorine atom can be substituted by one chlorine or hydrogen atom. Examples of said end groups are Cl(C$_3$F$_6$O)—, H(C$_3$F$_6$O)—. The unit a) C$_3$F$_6$O is —CF$_2$—CF(CF$_3$)O— or —CF(CF$_3$)CF$_2$O—.

In particular R$_f$ has preferably one of the following structures:

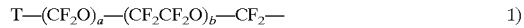

with b/a comprised between 0.3 and 10, extremes included, a being an integer different from 0;

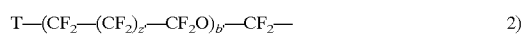

wherein z' is an integer equal to 1 or 2;

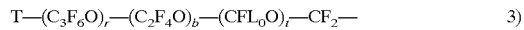

with r/b=0.5–2.0 (r+b)/t=10–30, b and t being integers different from 0 when all the units with indexes r, b, and t are present; or b=t=0, or b=0;

a, b, b', r, t, are integers, whose sum is such that R$_f$ has the above values of number average molecular weight.

The compounds wherein R$_f$ has the following formula are still more preferred:

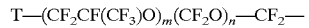

wherein m/n=1–30;

wherein T=—OCF$_3$ or —OCF$_2$Cl,

X is a carboxylic group and M is NH$_4$, K.

The (per)fluoropolyethers R$_f$ are obtainable with the processes well known in the prior art, see for example the following patents herein incorporated by reference: U.S. Pat. Nos. 3,665,041, 2,242,218, 3,715,378, and the European patent EP 239,123. The functionalized fluoropolyethers with hydroxyl termination are obtained for example according to patents EP 148,482, U.S. Pat. No. 3,810,874, from which the functional groups X are obtained with the processes mentioned in said patents.

It is also possible to use in polymerization chain transfer agents. For example iodides and/or bromides of alkaline or alkaline-earth metals, according to U.S. Pat. No. 5,173,553. Preferably chain transfer agents containing hydrogen, such as hydrocarbons, alcohols, in particular ethyl acetate and ethane are used.

The polymerization initiators used in the process of the present invention are preferably radical inorganic initiators, such for example the ammonium and/or potassium and/or sodium persulphate, optionally in combination with ferrous, cupreous or silver salts. The procedures of the initiator feeding into the polymerization reactor can be in a continuous way or by a single addition at the polymerization starting.

The polymerization reaction is generally carried out at temperatures in the range 25°–70° C., preferably 50°–60° C., under a pressure up to 30 bar, preferably higher than 8.

The monomer (B) is fed into the polymerization reactor in a continuous way or by step.

When the polymerization is over, the ionomer is isolated by conventional methods, such as the coagulation by addition of electrolytes or by cooling.

The present invention will now be better illustrated by the following embodiment Examples, which have a merely indicative but not limitative purpose of the scope of the invention itself.

EXAMPLES

Characterization

Hydration Percentage

After drying the membrane is weighed and subsequently hydrated in distilled water at 100° C. for 30 minutes; then it is extracted from the water, dried on the surface and weighed again.

The hydration percentage H % of the membrane is evaluated according to the following formula:

$$H\% = 100 \times (\text{weight hydrated} - \text{weight dried})/\text{weight dried}$$

Example 1

In a 22 litre autoclave the following reactants are introduced:

11.5 l of demineralized water;

980 g of the monomer of formula $CF_2=CF-O-CF_2CF_2-SO_2F$;

3,100 g of an aqueous solution at 5% by weight of a fluoropolyoxyalkylene with acid end group potassium salified having number average molecular weight 521, of formula: $CF_2ClO(CF_2CF(CF_3)O)_n(CF_2O)_m CF_2COOK$ wherein n/m=10;

The autoclave, kept under stirring at 540 rpm, is heated to 60° C. Then 150 ml of an aqueous solution having a concentration of 3 g/l of potassium persulphate (KPS) are fed into the autoclave. The pressure is brought to 12 absolute atm by introducing TFE. The reaction starts after 7 minutes. The pressure is maintained at 12 absolute atm by feeding TFE. When 800 g of TFE have been fed to the reactor, 220 g of the sulphonyl monomer of formula $CF_2=CF-O-CF_2-CF_2-SO_2F$ are introduced into the reactor. From now on, 220 g of the sulphonyl monomer of formula $CF_2=CF-O-CF_2CF_2SO_2F$ are introduced into the reactor every 200 g of fed TFE. The total amount of TFE fed to the reactor is equal to 4,000 g. The total ratio in the feeding of (B)/(A) by weight is 1.125. The reaction is stopped after 473 minutes by interrupting the TFE feeding, cooling and venting the reactor under vacuum. The produced latex has a solid content of 26.2% by weight. The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form by treatment at 80° C. for 24 hours with KOH at 10% by weight, subsequent washing with $H_2O$, and treatment at room temperature for 24 hours with HCl at 20% by weight, and subsequent washing with $H_2O$. The copolymer equivalent weight, determined by titration on the polymer in the acid form ($-SO_3H$), results to be 875 g/eq, corresponding to a composition of 85.6% by moles of TFE and 14.4% by moles of sulphonic monomer. The (B)/(A) ratio, by weight on the final polymer is 0.465. The polymer in the sulphonyl fluoride ($-SO_2F$) form results to have a MFI=58 g/10' at 280° C. with a load of 5 kg (ASTM D 1238-52T).

The polymer in the sulphonyl fluoride form is transformed into granules by a conic corotating Brabender twin-screw extruder having the screw diameter from 4.3 to 2.3 by using a melted temperature T=215° C.

The granules are transformed in film having a thickness ranging from 10 to 400 micron by using the above extruder with a melted temperature T=215° C.

A portion of the film is converted into the acid form by treatment at 80° C. for 24 hours with KOH at 10% by weight, washing with $H_2O$ and subsequent treatment at room temperature for 24 hours with HCl at 20% by weight and subsequent washing with $H_2O$. It has a hydration at 100° C. of 88.7%.

The film conditioned in air at 25° C. and 50% of relative humidity has a stress at break of 21 MPa (ASTM D 1708).

Example 2

In a 22 litre autoclave the following reactants are introduced:

11.5 l of demineralized water;

980 g of the monomer of formula $CF_2=CF-O-CF_2CF_2-SO_2F$;

3,100 g of an aqueous solution at 5% by weight of a fluoropolyoxyalkylene with acid end group potassium salified having number average molecular weight 521, of formula: $CF_2ClO(CF_2CF(CF_3)O)_n(CF_2O)_m CF_2COOK$ wherein n/m=10.

The autoclave, kept under stirring at 540 rpm, is heated to 60° C. Then 300 ml of an aqueous solution having a concentration of 3 g/l of potassium persulphate (KPS) are fed into the autoclave. The pressure is brought to 12 absolute atm by introducing TFE. The reaction starts after 1 minute. The pressure is maintained at 12 absolute atm by feeding TFE. When 800 g of TFE have been fed to the reactor, 220 g of the sulphonyl monomer of formula $CF_2=CF-O-CF_2-CF_2-SO_2F$ are introduced into the reactor. From now on, 220 g of the sulphonyl monomer of formula $CF_2=CF-O-CF_2CF_2SO_2F$ are introduced into the reactor every 200 g of fed TFE. The total amount of TFE fed to the reactor is equal to 4,000 g. The total ratio in the feeding of (B)/(A) by weight is 1.125. The reaction is stopped after 223 minutes by interrupting the TFE feeding, cooling and venting the reactor under vacuum. The produced latex has a solid content of 25.9% by weight. The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form by treatment at 80° C. for 24 hours with KOH at 10% by weight, washing with $H_2O$, and subsequent treatment at room temperature for 24 hours with HCl at 20% by weight, and subsequent washing with $H_2O$. The copolymer equivalent weight, determined by titration on the polymer in the acid form ($-SO_3H$), results to be 926 g/eq, corresponding to a composition of 86.6% by moles of TFE and 13.4% by moles of sulphonic monomer. The (B)/(A) ratio, by weight on the final polymer is 0.428. The polymer in the sulphonyl fluoride ($-SO_2F$) form results to have a MFI=13 g/10' at 280° C. with a load of 5 kg (ASTM D 1238-52T).

The polymer in the sulphonyl fluoride form is transformed into granules by a conic corotating Brabender twin-screw extruder having the screw diameter from 4.3 to 2.3 by using a melted temperature T=225° C.

The granules are transformed in film having a thickness ranging from 10 to 400 micron by using the above extruder with a melted temperature T=215° C.

A portion of the film is converted into the acid form by treatment at 80° C. for 24 hours with KOH at 10% by weight, washing with $H_2O$ and subsequent treatment at room temperature for 24 hours with HCl at 20% by weight and subsequent washing with $H_2O$. It has a hydration at 100° C. of 76.7%.

The film conditioned in air at 25° C. and 50% of relative humidity has a stress at break of 26 MPa (ASTM D 1708).

Example 3

In a 22 litre autoclave the following reactants are introduced:

11.5 l of demineralized water;

980 g of the monomer of formula $CF_2=CF-O-CF_2CF_2-SO_2F$;

3,100 g of an aqueous solution at 5% by weight of a fluoropolyoxyalkylene with acid end group potassium salified having number average molecular weight 521, of formula: $CF_2ClO(CF_2CF(CF_3)O)_n(CF_2O)_m CF_2COOK$ wherein n/m=10;

The autoclave, kept under stirring at 540 rpm, is heated to 50° C. Then 300 ml of an aqueous solution having a concentrationv of 28 g/l of potassium persulphate (KPS) are fed into the autoclave. The pressure is brought to 11 absolute atm by introducing TFE. The reaction starts after 1 minute. The pressure is maintained at 11 absolute atm by feeding TFE. When 1,000 g of TFE have been fed to the reactor, 175 g of the sulphonyl monomer of formula $CF_2=CF-O-CF_2-CF_2-SO_2F$ are introduced into the reactor. From now on, 175 g of the sulphonyl monomer of formula $CF_2=CF-O-CF_2CF_2SO_2F$ are introduced into the reactor every 200 g of fed TFE. The total amount of TFE fed to the reactor is equal to 4,000 g. The total ratio in the feeding of (B)/(A) by weight is 0.901. The reaction is stopped after 307 minutes from the start as described in Example 1. The produced latex has a solid content of 26.0% by weight. The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form by treatment at 80° C. for 24 hours as described in Example 1. The copolymer equivalent weight, determinuteed by titration on the polymer in the acid form results to be 980 g/eq, corresponding to a composition of 87.5% by moles of TFE and 12.5% by moles of sulphonic monomer. The (B)/(A) ratio, by weight on the final polymer is 0.395. The polymer in the sulphonyl fluoride form results to have a MFI=0.4 g/10' at 280° C. with a load of 5 kg.

The polymer in the sulphonyl fluoride form is transformed into granules by the extruder of Example 1 by using a melted temperature T=315° C.

The granules are transformed in film having a thickness ranging from 10 to 400 micron by the extruder of Example 1 by using a melted temperature T=300° C.

A part of the film is converted into the acid form as in Example 1.

It has a hydration at 100° C. of 43.9%. The film conditioned in air at 25° C. and 50% of relative humidity has a stress at break of 30 MPa.

Example 4

In a 22 litre autoclave the following reactants are introduced:

11.5 l of demineralized water;

980 g of the monomer of formula $CF_2=CF-O-CF_2CF_2-SO_2F$;

3,100 g of an aqueous solution at 5% by weight of a fluoropolyoxyalkylene with acid end group potassium salified having number average molecular weight 521, of formula: $CF_2ClO(CF_2CF(CF_3)O)_n(CF_2O)_m CF_2COOK$ wherein n/m=10;

The autoclave, kept under stirring at 540 rpm, is heated to 50° C. 0.2 atm of ethane are fed into the reactor. Then 300 ml of an aqueous solution having a concentration of 28 g/l of potassium persulphate (KPS) are fed into the autoclave. The pressure is brought to 11 absolute atm by introducing TFE. The reaction starts after 1 minute. The pressure is maintained at 11 absolute atm by feeding TFE. When 1,000 g of TFE have been fed to the reactor, 175 g of the sulphonyl monomer of formula $CF_2=CF-O-CF_2-CF_2-SO_2F$ are introduced into the reactor. From now on, 175 g of the sulphonyl monomer of formula $CF_2=CF-O-CF_2CF_2SO_2F$ are introduced into the reactor every 200 g of fed TFE. The total amount of TFE fed to the reactor is equal to 4,000 g. The total ratio in the feeding of (B)/(A) by weight is 0.901. The reaction is stopped after 327 minutes from the start as in Example 1.

The produced latex has a solid content of 26.0% by weight. The latex is coagulated by freezing and unfreezing, the polymer is separated from the mother liquors, washed with water up to a constant pH of the washing waters and dried at 150° C. for 40 hours at room pressure. Some grams of the dried polymer powder are converted into the acid form as in Example 1.

The copolymer equivalent weight, determined by titration on the polymer in the acid form results to be 1,010 g/eq, corresponding to a composition of 88% by moles of TFE and 12% by moles of sulphonic monomer. The (B)/(A) ratio, by weight on the final polymer is 0.379. The polymer in the sulphonyl fluoride form results to have a MFI=14 g/10' at 280° C. with a load of 5 kg. The polymer in the sulphonyl fluoride form is transformed into granules by the extruder of Example 1 by using a melted temperature T=225° C.

The granules are transformed in film having a thickness ranging from 10 to 400 micron by extrusion by using a melted temperature T=240° C.

A part of the film is converted into the acid form as in Example 1.

It has a hydration at 100° C. of 43.5%. The film conditioned in air at 25° C. and 50% of relative humidity has a stress at break of 29 MPa.

Example 5

In a 22 litre autoclave the following reactants are introduced:

11.5 l of demineralized water;

980 g of the monomer of formula $CF_2=CF-O-CF_2CF_2-SO_2F$;

3,100 g of an aqueous solution at 5% by weight of a fluoropolyoxyalkylene with acid end group potassium salified having number average molecular weight 521, of formula: $CF_2ClO(CF_2CF(CF_3)O)_n(CF_2O)_m CF_2COOK$ wherein n/m=10;

The autoclave, kept under stirring at 540 rpm, is heated to 50° C. Then 300 ml of an aqueous solution having a concentration of 28 g/l of potassium persulphate (KPS) are fed into the autoclave. The pressure is brought to 12 absolute atm by introducing TFE. The reaction starts after 1 minute. The pressure is maintained at 12 absolute atm by feeding TFE. When 1,000 g of TFE have been fed to the reactor, 175 g of the sulphonyl monomer of formula $CF_2=CF-O-CF_2-CF_2-SO_2F$ are introduced into the reactor. From now on, 175 g of the sulphonyl monomer of formula $CF_2=CF-O-CF_2CF_2SO_2F$ are introduced into the reactor every 200 g of fed TFE. The total amount of TFE fed to the reactor is equal to 4,000 g. The total ratio in the feeding of (B)/(A) by weight is 0.901. The reaction is stopped after 224 minutes from the start according to the procedure of Example 1. The produced latex has a solid content of 28.8% by weight. The latex is coagulated as in Example 1, washed with water up to a constant pH of the washing waters and dried at 150° C. for 40 hours at room pressure. Some grams of the dried polymer powder are converted into the acid form as in Example 1.

The copolymer equivalent weight, determined by titration on the polymer in the acid form results to be 1,106 g/eq, corresponding to a composition of 89.2% by moles of TFE and 10.8% by moles of sulphonic monomer. The (B)/(A) ratio, by weight on the final polymer is 0.335. The polymer in the sulphonyl fluoride form results to have a MFI=0.2 g/10' at 280° C. with a load of 5 kg (MFI=18/10' at 280° C. with a load of 10 kg).

The polymer in the sulphonyl fluoride form is transformed into granules by the extruder of Example 1 by using a melted temperature T=315° C.

The granules are transformed in film having a thickness ranging from 10 to 400 micron by extrusion by using a melted temperature T=300° C.

A part of the film is converted into the acid form as in Example 1.

It has a hydration at 100° C. of 35%.

The film conditioned in air at 25° C. and 50% of relative humidity has a stress at break of 34 MPa.

Example 6

In a 22 litre autoclave the following reactants are introduced:

11.5 l of demineralized water;

980 g of the monomer of formula $CF_2=CF-O-CF_2CF_2-SO_2F$;

3,100 g of an aqueous solution at 5 by weight of a fluoropolyoxyalkylene with acid end group potassium salified having number average molecular weight 521, of formula: $CF_2ClO(CF_2CF(CF_3)O)_n(CF_2O)_m CF_2COOK$ wherein n/m=10;

The autoclave, kept under stirring at 540 rpm, is heated to 50° C. 0.2 atm of ethane are fed into the reactor. Then 300 ml of an aqueous solution having a concentration of 14 g/l of potassium persulphate (KPS) are fed into the autoclave. The pressure is brought to 13 absolute atm by introducing TFE. The reaction starts after 6 minutes. The pressure is maintained at 13 absolute atm by feeding TFE. When 800 g of TFE have been fed to the reactor, 220 g of the sulphonyl monomer of formula $CF_2=CF-O-CF_2-CF_2-SO_2F$ are introduced into the reactor. From now on, 220 g of the sulphonyl monomer of formula $CF_2=CF-O-CF_2CF_2SO_2F$ are introduced into the reactor every 200 g of fed TFE. The total amount of TFE fed to the reactor is equal to 4,000 g. The total ratio in the feeding of (B)/(A) by weight is 1.125. The reaction is stopped after 429 minutes from the start according to the procedure of Example 1. The produced latex has a solid content of 24.4% by weight. The latex is coagulated as in Example 1, washed with water up to a constant pH of the washing waters and dried at 150° C. for 40 hours at room pressure. Some grams of the dried polymer powder are converted into the acid form as in Example 1.

The copolymer equivalent weight, determined by titration on the polymer in the acid form results to be 1,190 g/eq, corresponding to a composition of 90.1% by moles of TFE and 9.9% by moles of sulphonic monomer. The (B)/(A) ratio, by weight on the final polymer is 0.304. The polymer in the sulphonyl fluoride form results to have a MFI=10 g/10' at 280° C. with a load of 5 kg.

The polymer in the sulphonyl fluoride form is transformed into granules by the extruder of Example 1 by using a melted temperature T=265° C.

The granules are transformed in film having a thickness ranging from 10 to 400 micron by extrusion by using a melted temperature T=260° C.

A part of the film is converted into the acid form as in Example 1.

It has a hydration at 100° C. of 31.0%.

What is claimed is:

1. Semicrystalline sulphonic fluorinated ionomers having an equivalent weight higher than 700 g/eq, up to 1,700, comprising:

(A) monomeric units deriving from one or more fluorinated monomers containing at least one ethylene unsaturation;

(B) fluorinated monomeric units containing sulphonyl groups —$SO_2F$ in such amount to give the above equivalent weight, deriving from $F_2C=CF-O-(CF_2)_q-SO_2F$, q being an integer equal to 2 or 3;

and having the following properties for a TFE/(B) copolymer wherein q=2:

hydration, expressed in % of $H_2O$ at 100° C. absorbed by the film prepared from the ionomer and after transformation from the —$SO_2F$ form into the —$SO_3H$ form, having the following values:

| at | 750 EW | higher than | >70% |
|----|--------|-------------|------|
| at | 850 EW | " | >55% |
| at | 1,000 EW | " | >40% |
| at | 1,100 EW | " | >32% |
| at | 1,200 EW | " | >25%. |

2. Ionomers according to claim 1, wherein the TFE/(B) copolymers wherein q=2 show extrudability in film, under the —$SO_2F$ form, with thickness of 20 μm having good mechanical properties.

3. Ionomers according to claim 1, wherein the TFE/(B) co-polymers wherein q=2 show a melt flow index comprised between 0.01 and 100 g/10', with a load of 5 kg measured at 280° C., and after transformation from the —$SO_2F$ form into the —$SO_3H$ form.

4. Ionomers according to claim 1, wherein the TFE/(B) co-polymers wherein q=2, have the following mechanical properties of the film at 230° C. at:

| 750 EW | tensile stress (MPa) | >5 |
|--------|----------------------|-----|
| 850 EW | " | >15 |
| 1,000 EW | " | >25 |
| 1,100 EW | " | >28 |
| 1,200 EW | " | >30. |

5. Ionomers according to claim 1, wherein the fluorinated monomers of type (A) are selected from:

vinylidene fluoride (VDF);

$C_2$–$C_8$ perfluoroolefins, preferably tetrafluoroethylene (TFE);

chlorotrifluoroethylene (CTFE), optionally in the presence of ethylene, (per)fluoroalkylvinylethers (PAVE) $CF_2=CFOR_f$, wherein $R_f$ is a $C_1$–$C_6$ (per) fluoroalkyl, for example trifluoromethyl, pentafluoropropyl;

perfluoro-oxyalkylvinylethers $CF_2=CFOX$, wherein X is a $C_1$–$C_{12}$ perfluoro-oxyalkyl having one or more ether groups, for example perfluoro-2-propoxy-propyl.

6. Ionomers according to claim 5, wherein (A) is TFE; (B) is the monomer with q=2.

7. Ionomers according to claim 1, wherein the sulphonic fluorinated Ionomers contain from 0.01 to 5% by moles of monomeric units deriving from a bis-olefin of formula:

$$R_1R_2C=CH-(CF_2)_{m0}-CH=CR_5R_6 \qquad (I)$$

wherein:

m0 =2–10, preferably 4–8;

$R_1$, $R_2$, $R_5$, $R_6$, equal to or different from each other, are H or $C_1$–$C_5$ alkyl groups.

8. Ionomers according to claim 1, wherein the ionomers contain inorganic or polymer fillers in a filler amount between 0 and 20% by weight with respect to the ionomer.

9. Ionomers according to claim 1, wherein the equivalent weight is higher than 700.

10. Membranes obtainable with the ionomers according to claim 1.

11. Membranes according to claim 10, wherein the membranes are subjected to the activation treatment to transform the sulphonyl groups —$SO_2F$ into the sulphonic groups —$SO_3H$.

12. Membranes according to claim 10, having thicknesses from 5 $\mu M$ to 500 $\mu M$.

13. Membranes according to claim 10, wherein the equivalent weight is comprised between 720 and 1,200.

14. A process for operating fuel cells wherein the membranes according to claim 10 are utilized.

15. A process for the preparation of sulphonic ionomers according to claim 1 by a radical polymerization process in bulk, suspension, emulsion wherein it is used a ratio: higher than 2.20, for EW up to 800; said ratio being higher than 2.00 for EW>800.

16. A process for the preparation of sulphonic monomers according to claim 15, wherein the polymerization is carried out in aqueous emulsion or in microemulsion.

17. A process for the preparation of sulphonic ionomers according to claim 16, wherein (per)fluorinated surfactants are used selected from the salts of the perfluorooctanoic, perfluorononanoic, perfluorodecanoic acid, or mixtures thereof; (per)fluoropolyethers with an acid end group selected from COOH, —$SO_3H$, salified with $NH_4^+$, alkaline metals, the other end group being (per)fluorinated, optionally containing one H or Cl atom.

18. A process for the preparation of sulphonic monomers according to claim 17, wherein the number average molecular weights of the perfluoropolyether surfactants range from 300 to 1,800.

19. A process for the preparation of sulphonic monomers according to claim 15, wherein the polymerization is carried out in aqueous emulsion wherein in the reaction medium as surfactants those of formula:

are used, wherein

X is equal to —COO, —$SO_3$;

M is selected from H, $NH_4$, alkaline metal;

$R_f$ represents a (per) fluoropolyether chain, preferably having number average molecular weight comprised between about 230 and about 1,800, said (per) fluoropolyether chain comprising repeating units selected from one or more of the following:

a) —($C_3F_6O$)—;

b) —($CF_2CF_2O$)—;

c) —($CFL_oO$)—, wherein $L_o$—F, —$CF_3$;

d) —$CF_2$ $(CF_2)_{z'}$ $_{CF2}O$—, wherein z' is an integer 1 or 2;

e) —$CH_2CF_2CF_2O$—;

$R_f$ is monofunctional, and has a (per)fluorooxyalkyl end group T, optionally in the perfluoroalkyl end groups one fluorine atom is substituted by one chlorine or hydrogen atom.

* * * * *